(12) United States Patent
Matsuo et al.

(10) Patent No.: US 7,131,396 B2
(45) Date of Patent: *Nov. 7, 2006

(54) ANIMAL TOILET

(75) Inventors: Takayuki Matsuo, Tokyo (JP); Takeshi Ikegami, Tokyo (JP)

(73) Assignee: Uni-Charm Petcare Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/346,950

(22) Filed: Feb. 3, 2006

(65) Prior Publication Data

US 2006/0124068 A1 Jun. 15, 2006

Related U.S. Application Data

(63) Continuation of application No. 10/739,851, filed on Dec. 18, 2003, now Pat. No. 6,994,054.

(30) Foreign Application Priority Data

Jun. 20, 2003 (JP) ............... 2003-177386

(51) Int. Cl.
*A01K 29/00* (2006.01)
(52) U.S. Cl. ...................................... 119/166
(58) Field of Classification Search ..................... None
See application file for complete search history.

(56) References Cited

U.S. PATENT DOCUMENTS

| | | | | |
|---|---|---|---|---|
| 3,818,865 A * | 6/1974 | Sinclair | ....................... | 119/161 |
| 5,184,574 A * | 2/1993 | Kirk et al. | ................... | 119/162 |
| 5,193,488 A * | 3/1993 | Walton | ....................... | 119/166 |
| 5,289,800 A * | 3/1994 | Walton | ....................... | 119/166 |
| 5,329,879 A * | 7/1994 | Walton | ....................... | 119/166 |
| 5,353,743 A * | 10/1994 | Walton | ....................... | 119/166 |
| 5,983,831 A * | 11/1999 | Thompson | ................... | 119/165 |
| 6,109,212 A * | 8/2000 | Schacherbauer | ............ | 119/165 |
| 6,237,534 B1 * | 5/2001 | Schwartz | .................... | 119/165 |
| 6,332,429 B1 * | 12/2001 | Gramlich | .................... | 119/165 |
| 6,412,440 B1 * | 7/2002 | Kobayashi | .................. | 119/161 |
| 6,487,989 B1 * | 12/2002 | Yamamoto | .................. | 119/161 |
| 6,510,814 B1 * | 1/2003 | Vargas | ......................... | 119/165 |
| 6,578,520 B1 * | 6/2003 | Otsuji et al. | ................ | 119/165 |
| 2003/0116095 A1 * | 6/2003 | Otsuji | ......................... | 119/165 |

* cited by examiner

*Primary Examiner*—Son T. Nguyen
(74) *Attorney, Agent, or Firm*—Butzel Long (57) ABSTRACT

An animal toilet is provided that can be cleaned easily, particularly an animal toilet that allows liquid such as urine evacuated therein to move to a liquid-absorbing sheet efficiently. The animal toilet includes a dripping container having an opening for an animal entering and exiting, and a liquid penetrating bottom part on which liquid is dispersed; and a liquid-absorbing sheet holder placed under the bottom part of the dripping container on which a liquid-absorbing sheet is placed, in which the bottom part of the dripping container has a liquid leading part formed by connected arches on a side facing the liquid-absorbing sheet.

15 Claims, 7 Drawing Sheets

ANIMAL TOILET

RELATED APPLICATION

The present application is a continuation of U.S. patent application Ser. No. 10/739,851, filed Dec. 18, 2003, now U.S. Pat. No. 6,994,054, to which priority is claimed under 35 U.S.C. §120 and through which priority is claimed to Japanese Patent Application No. 2003-177386, filed Jun. 20, 2003, under 35 U.S.C. §119.

BACKGROUND OF THE INVENTION

1. Field of the Invention

The present invention relates to an animal toilet for animals kept in rooms such as cats and dogs, which can be cleaned easily.

2. Description of Related Art

A plastic container in which granular materials called animal litter are contained has been used as an animal toilet for animals kept in rooms such as cats and dogs. Mineral materials such as zeolite, river sand and bentonite which becomes hard when it absorbs liquid like urine, and cellulose grains made of crushed pulp hardened to shape granular. An animal such as a cat enters the animal toilet, and evacuates urine or feces on the animal litter. An owner removes the animal litter soiled with urine or feces with a scoop along with feces out of a container, and replenishes new animal litter in accordance with an amount of the animal litter removed.

However, since pet animals like cats have the habit of mixing animal litter with their paws after evacuation, an amount of animal litter soiled with urine or feces is increased and the soiled animal litter is scattered. Thus, it is difficult to remove only the soiled animal litter. Furthermore, the zeolite and river sand do not absorb urine, and bentonite and cellulose grains absorb urine to some extent but cannot absorb it completely. On this account, urine passes through the litter and tends to be held in the container. Therefore, the owner needs not only discard a part of the animal litter at every time of animal evacuation but also needs to change all of the animal litter contained in the container once a week or two weeks, to clean and dry the container, and to place new litter in the container for keeping the animal toilet cleaned. It increases an amount of animal litter to be discarded. Moreover, when mineral sand such as zeolite is used as the animal litter, it is difficult to be discarded as waste, because it is non-combustible.

As a product to solve the problems mentioned above, an animal toilet disclosed in Japanese unexamined patent publication No. 10-229768-A(Patent Document 1) is developed, for example. In the animal toilet disclosed in patent Document 1, a plurality of water repellent granular materials are placed in a container having a bottom part comprising a sheet with liquid passing structure. A liquid-absorbing sheet supported by a support body is disposed under the bottom part of the container in close contact with the sheet, in which urine passes through the water repellent granular materials and through the bottom part of the container, and then is absorbed into the liquid-absorbing sheet. Accordingly, since urine does not remain in the container, the animal toilet is cleaned only by changing the liquid-absorbing sheet once a day. It is fine that the entire granular materials are changed once a month or two months. The animal toilet can save the trouble to change the animal litter and can reduce an amount of waste.

However, the liquid-absorbing sheet supported by the support body is disposed under the bottom of the container in contact with the bottom in this traditional example. Thus, when an amount of urine absorbed into the liquid-absorbing sheet is increased by long time use, urine returns back to the granular materials to soil the entire granular materials. Moreover, the liquid-absorbing sheet should be changed once a day, waste is generated everyday even though it occurs once a day, being troublesome.

SUMMARY OF THE INVENTION

The present invention has been made in view of the problems mentioned above. An object of the present invention is to provide an animal toilet that can be cleaned easily.

As a result of diligent investigation done by the inventors in order to achieve the object, they found that urine is allowed to move to a liquid-absorbing sheet efficiently when an animal toilet, which has a container for liquid dispersed on the bottom part of the container to pass through the bottom part, and a liquid-absorbing sheet holder for placing a liquid-absorbing sheet for absorbing urine, is equipped with a liquid leading part formed by connected arches which is disposed on the side facing the liquid-absorbing sheet in the bottom part of the container.

More specifically, the invention is to provide the following.

(1) An animal toilet including a dripping container having an opening for an animal entering and exiting, and a liquid passing bottom part; and a liquid-absorbing sheet holder placed under the bottom part of the dripping container for holding a liquid-absorbing sheet thereon in which the bottom part of the dripping container has a grid of connected longitudinal elements and lateral elements, the lateral elements defining arches on a side of the bottom part facing the liquid-absorbing sheet, and in which the arches have end portions that coincide with at least one of the longitudinal elements and the lateral directions and central portions that are spaced further from the liquid-absorbing sheet holder than the end portions, so that a liquid dispersed on the bottom part of the dripping container will be directed by the arches toward the ends of the arches.

According to this invention, liquid such as urine evacuated onto the bottom of the dripping container passes through and drips from the bottom part which allows the urine to pass through to the liquid-absorbing sheet placed thereunder, and is absorbed into the liquid-absorbing sheet.

Since the dripping container has the bottom having a liquid leading part having the structure of a grid having the arches, the drops of urine aggregate along the liquid leading part and move smoothly to the liquid-absorbing sheet. Moreover, since the liquid-absorbing sheet is placed under the bottom part of the dripping container at the position facing thereto in a predetermined distance apart, urine evacuated onto the bottom part passes through the bottom part, and moves to the back side (the side facing the liquid-absorbing sheet) of the bottom part, and is efficiently collected along the liquid leading part formed by connected arches on the back side of the bottom part, and then, drips onto the liquid-absorbing sheet placed thereunder for absorption.

Furthermore, since the liquid-absorbing sheet is not in contact with the bottom part of the dripping container, liquid such as urine having been absorbed into the liquid-absorbing sheet does not return back to the bottom part of the container. Therefore, liquid like urine does not return to the animal litter container.

Here, the liquid passing bottom part is such a product that allows liquid such as urine evacuated to easily pass from the top side (the side on which an animal gets in) of the bottom part of the dripping container to the back side (the side facing the liquid-absorbing sheet). The liquid passing bottom part has a plurality of opening parts which makes the bottom part meshed or striped. The bottom part is required to have strength that it is not damaged when an animal such as a cat is on it as well as the property that allows liquid such as urine to transfer smoothly. To this end, a ratio of the total opening area formed by a plurality of the opening parts to area of the bottom part (it is called an open area ratio) is 25 to 50%, preferably 40 to 45%.

Moreover, the liquid leading part is for allowing liquid such as urine that has passed through the opening parts of the bottom part to efficiently drip from the bottom part onto the liquid-absorbing sheet. The liquid leading part is formed by connected arches projecting toward the bottom part from the liquid-absorbing sheet side. Liquid is led along the arches, aggregates on the legs of the arches where arches laying side-by-side are connected each other, and then efficiently drips from the bottom part. It is preferable that the arch part is a round chord and has a length of 6 to 12 mm and a height of 3 to 5 mm. In addition, the liquid leading part can be formed by another shape than arc-shaped as long as liquid can be efficiently led to the liquid-absorbing sheet.

Besides, it is more preferable that the surface of the bottom part has proper wettability, because liquid such as urine tends to be more easily led and collected along the arch parts when liquid is contacted with the surface of the bottom part.

Nonwoven fabric, paper and sheeted cotton, liquid-absorbing materials such as water absorbent polymers, silica gel, or crushed pulp can be used as a liquid-absorbing sheet. However, it is preferable that the liquid-absorbing sheet has a water capacity of 400 g/2000 cm$^2$, in which an antimicrobial agent such as didecyldimethylammonium adipate of a cationic surfactant, or a bacteriostatic agent such as citric acid is added to prevent odors of urine and prevent urine from becoming rotten. Besides, it is preferable that the liquid-absorbing sheet has a liquid permeable front layer and a liquid impermeable back layer. The front layer absorbs the liquid dripped from the bottom part. The front layer is preferably white to allow the amount and color of animal's urine to be known and the health condition of the animal to be known.

In this specification, 'animals' means not only pet animals like dogs, cats, rabbits and hamsters but also cubs of large-sizes animals such as tigers, lions and bears. Furthermore, 'liquid' means all fluid mass which is evacuated from animals and is capable of passing through the bottom of the dripping container. 'Liquid' includes moisture contained in feces of animals. 'Liquid passing' means that liquid moves from the top side to the back side of the bottom part. Besides, 'being wet' is a phenomenon that a part of the surface of a solid is replaced in the interface between liquid and the solid when the surface of the solid touches the liquid. 'Wettablity' is easiness that liquid spreads over the surface of a solid.

(2) The animal toilet according to (1), in which the bottom part includes a plurality of opening parts, and in which an open area ratio of the opening part of the bottom part occupied by the opening parts is 25 to 50% of an area of the bottom part.

According to this invention, liquid such as urine evacuated from an animal passes through the opening parts in the bottom part and to the back side of the bottom part. Therefore, the liquid does not remain on the bottom of the dripping container.

Furthermore, liquid such as urine evacuated from an animal is allowed to smoothly move to the back side of the bottom part through the opening parts, and the strength that the bottom part is not damaged when an animal such as a cat is on it can be kept. When the open area ratio is smaller than 25%, liquid such as urine evacuated from an animal such as a cat takes time to pass through the bottom part. On the other hand, when the open area ratio is greater than 50%, it is likely that the bottom part is broken when an animal such as a cat is on it because the strength of the bottom part is reduced. Here, 'open area ration' means the ratio of opening part made by opening part to the area of the bottom part.

(3) The animal toilet according to (1) or (3), in which the bottom part is detachable from the dripping container.

According to this invention, since only the bottom part can be removed from the dripping container and can be washed, effort of cleaning can be saved.

(4) The animal toilet according to any one of (1) to (3), in which the liquid-absorbing sheet has an area greater than that of the bottom part of the dripping container.

According to this invention, liquid such as urine dripping from the bottom part of the dripping container is to surely drop onto the surface of the liquid-absorbing sheet, and thus the liquid does not drop on floor to soil.

(5) The animal toilet according to any one of (1) to (4), in which the liquid-absorbing sheet holder is loadably incorporated under the bottom part of the dripping container.

According to this invention, since the liquid-absorbing sheet holder is loadably incorporated as a part of the animal toilet, it can be drawn separately without removing the dripping container. Therefore, the work to change the liquid-absorbing sheet that has absorbed liquid such as urine in a saturation state is done easily.

(6) The animal toilet according to any one of (1) to (5), in which the animal toilet has a drawer structure that houses the liquid-absorbing sheet holder.

(7) The animal toilet according to (6), in which the animal toilet has a drawer structure that houses the liquid-absorbing sheet holder, and in which the liquid-absorbing sheet holder is loadably incorporated under the bottom of the dripping container as a drawer.

According to this invention, since the liquid-absorbing sheet holder for placing the liquid-absorbing sheet is formed into the drawer body, only the liquid-absorbing sheet holder can be taken out without removing the dripping container. Therefore, when an owner of an animal changes the liquid-absorbing sheet placed on the bottom of the liquid-absorbing sheet holder that has absorbed liquid such as urine in the saturation state, he or she can change the liquid-absorbing sheet only by drawing the liquid-absorbing sheet holder from the dripping container with easy work. The liquid-absorbing sheet holder is in the form of a drawer and the liquid-absorbing sheet is placed on the bottom at a distance from the bottom part of the dripping container. However, since the back side (the side facing the liquid-absorbing sheet) of the bottom part of the dripping container has a liquid leading part formed by connected arches, liquid such as urine is allowed to efficiently move to the liquid-absorbing sheet as described in (1).

(8) The animal toilet according to any one of (1) to (7) further including a removable cover for controlling a direction of an animal entering and exiting the toilet.

According to this invention, it is to serve to prevent an animal such as a cat from entering and exiting of the place other than the entrance formed by the cover. For the cover, for example, it is a frame having a nearly rectangular bottom, in which sidewalls are erected on the frame in three sides and an opening for an animal entering and exiting is formed in the remaining side. The height of the sidewalls is the height that an animal does not jump over, preferably 10 cm or higher, more preferably 10 to 40 cm.

(9) The animal toilet according to any one of (1) to (8), in which the liquid-absorbing sheet has an antimicrobial and bacteriostatic part having both an antimicrobial property and a bacteriostatic property.

(10) The animal toilet according to any one of (1) to (8), in which the liquid-absorbing sheet has an antimicrobial part having an antimicrobial property and a bacteriostatic part having a bacteriostatic property According to this invention, since the liquid-absorbing sheet has antimicrobial and bacteriostatic property, odors of urine can be prevented, and urine can be prevented from becoming rotten.

BRIEF DESCRIPTION OF THE DRAWINGS

The teachings of the invention can be readily understood by considering the following detailed description in conjunction with the accompanying drawings, in which:

FIGS. 5A and 5B are perspective views illustrating a bottom part of the dripping container.

DESCRIPTION OF THE PREFERRED EMBODIMENT

Hereinafter, embodiments of the invention will be described with reference to the drawings. In addition, the invention is not limited by these and the dimensions are properly adjusted for easy understanding in these drawings.

Figure 1:
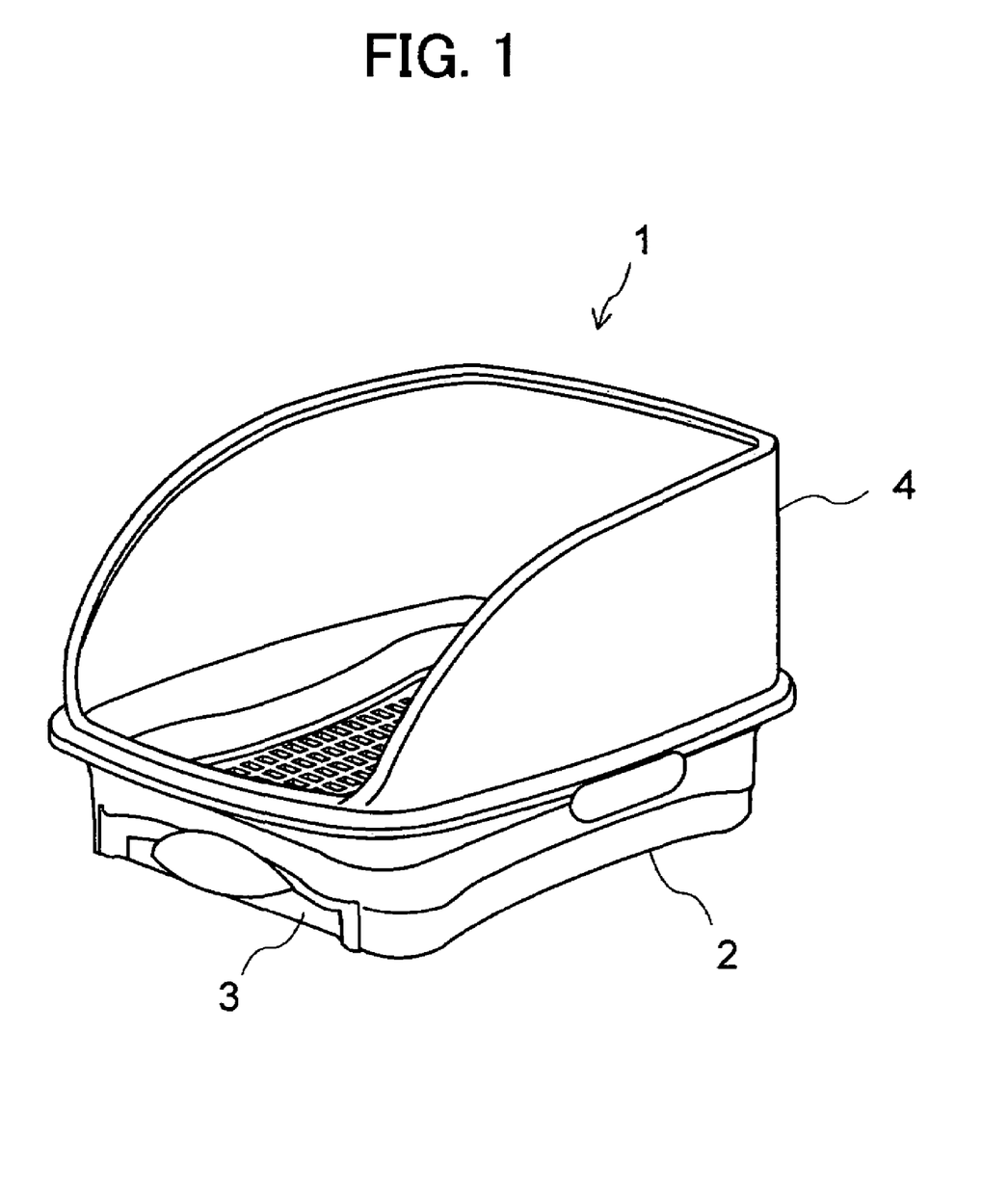
FIG. 1 is a general view illustrating a first embodiment of the animal toilet according to the present invention.
Figure 2:
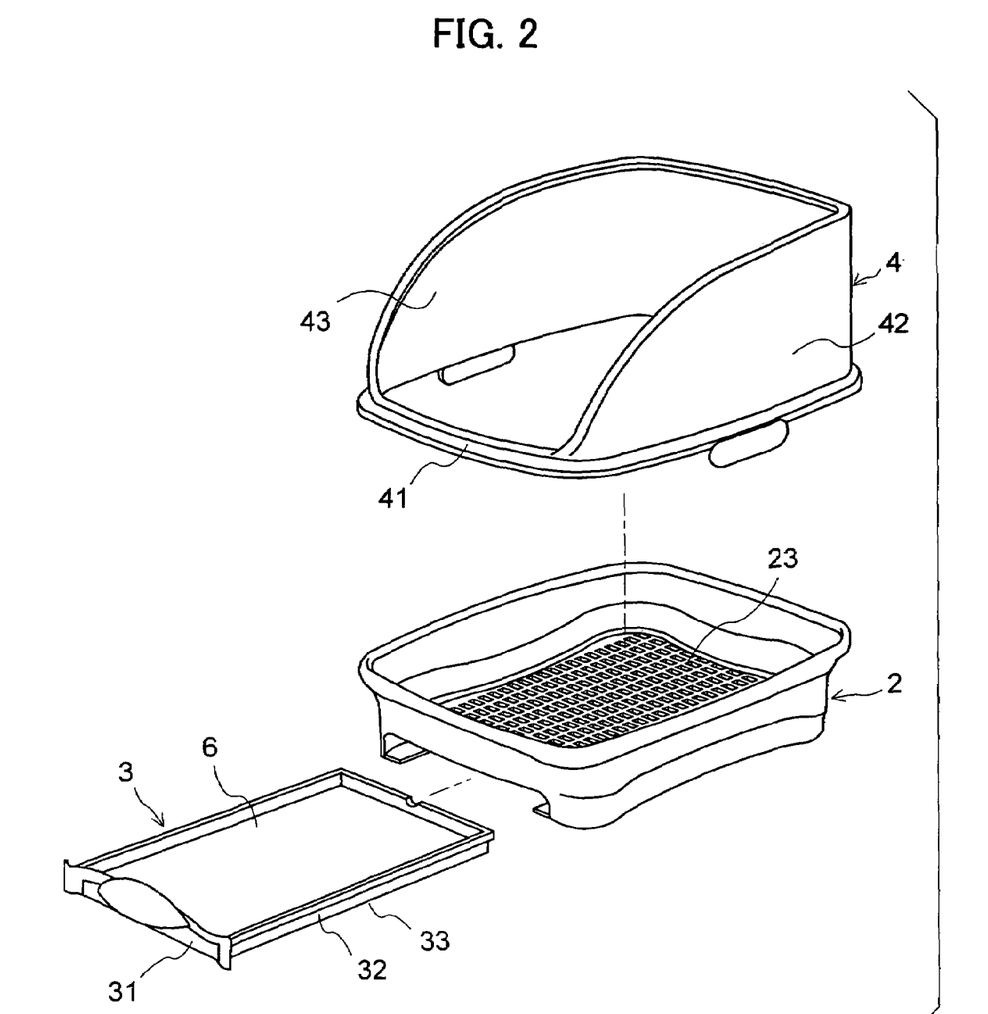
FIG. 2 is an exploded perspective view illustrating an animal toilet of the first embodiment.
Figure 3:
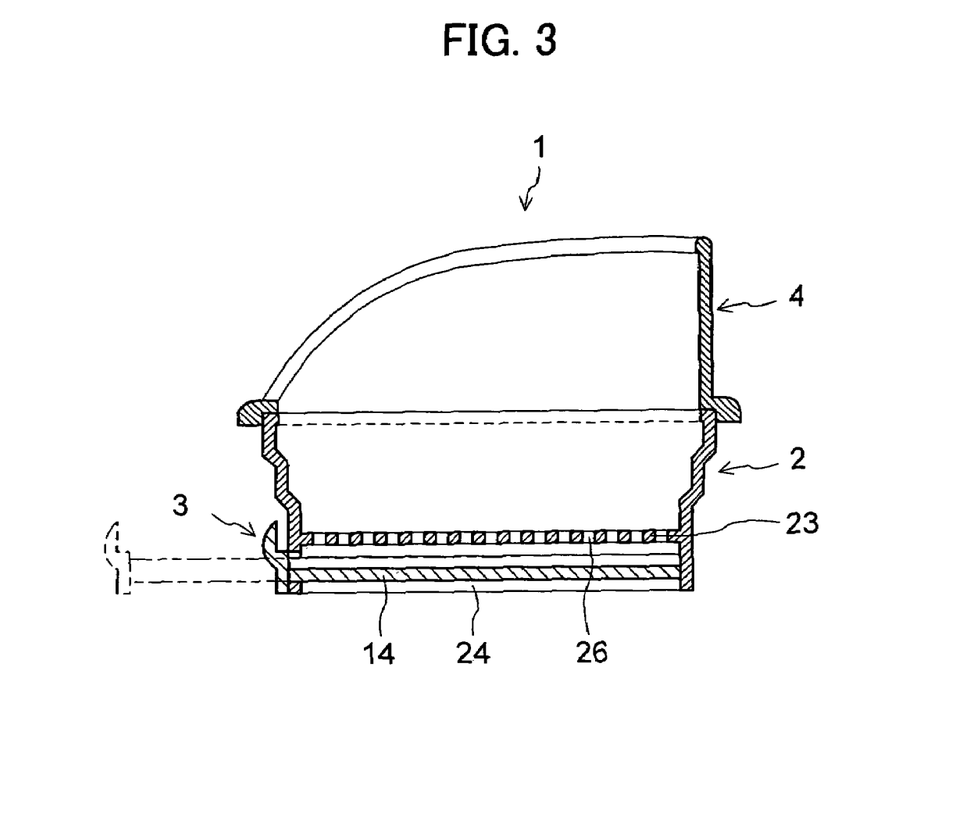
FIG. 3 is a longitudinal cross-sectional view illustrating the animal toilet shown in FIG. 2.

As shown in FIGS. 1 to 3, an animal toilet 1 according to the present invention is configured to have main components, a box-shaped dripping container 2 for liquid evacuated onto the bottom thereof to pass through, a liquid-absorbing sheet holder 3 loadably incorporated under the dripping container 2 for holding a liquid-absorbing sheet 6, and a cover 4 disposed on the top part of the dripping container 2. The liquid-absorbing sheet 6 is placed in the liquid-absorbing sheet holder 3.

Figure 4:
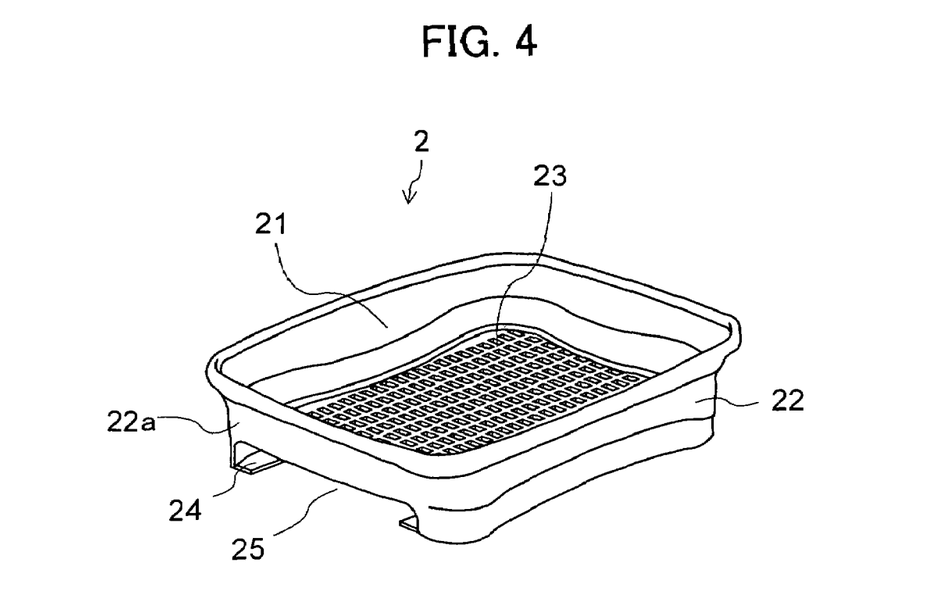
FIG. 4 is a perspective view illustrating a dripping container.

As shown in FIG. 4, the dripping container 2 has an opening 21 for an animal entering and exiting, which is configured of four sidewalls 22, the bottom part 23 formed at a predetermined position of the sidewalls 22, and a lower frame 24. The dripping container 2 is formed by molding plastic materials including polyolefine resins such as polyethylene (PE), polypropylene (PP) and polyethylene terephthalate (PET), and metal plates such as stainless steel. Furthermore, among the four sidewalls 22, a drawer opening 25 is formed in a front sidewall 22a (the sidewall on the left side in the drawing) under the bottom part 23.

Figure 5A:
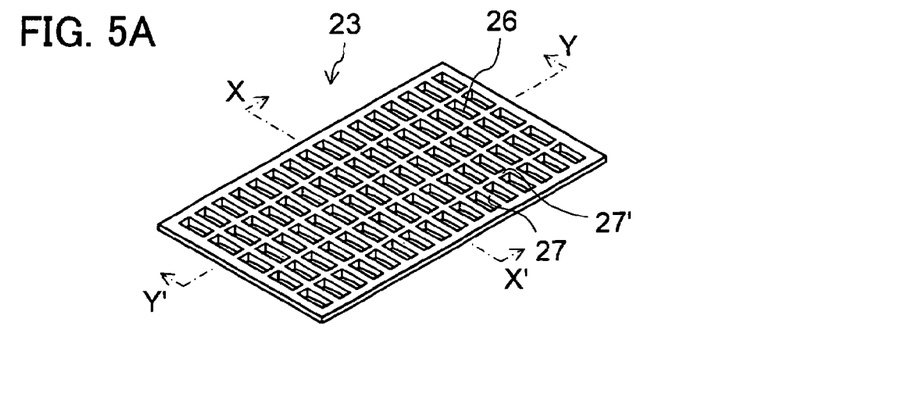
FIG. 5A is a perspective view seen from the top side and FIG. 5B is a perspective view seen from the back side.
Figure 5B:
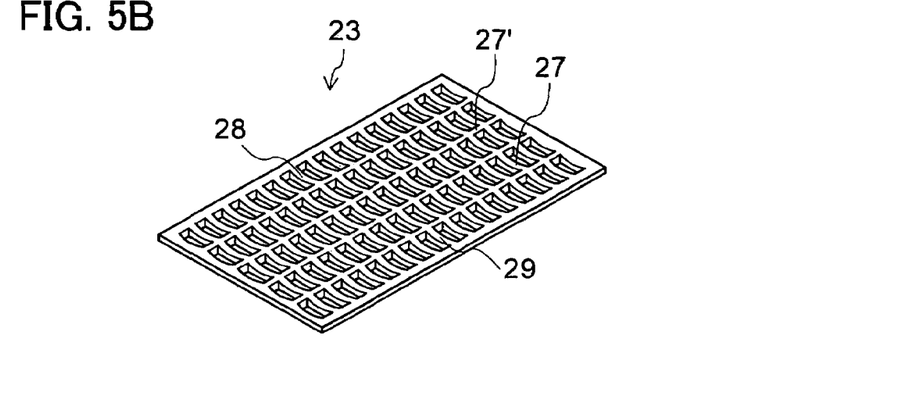
Figure 6A:
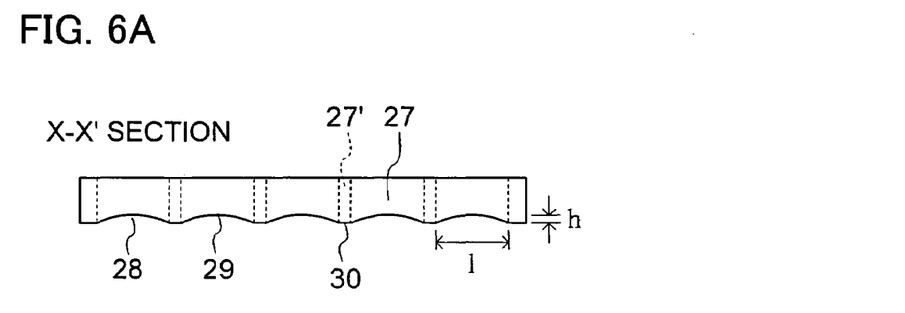
FIG. 6A is a cross-sectional view illustrating X–X' cross section of the bottom part shown in FIG. 5A
Figure 6B:
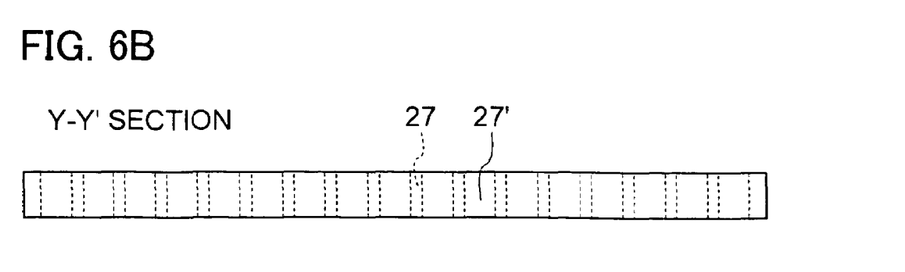
FIG. 6B is a cross-sectional view illustrating Y–Y' cross section of the bottom part shown in FIG. 5A.
Figure 7A:
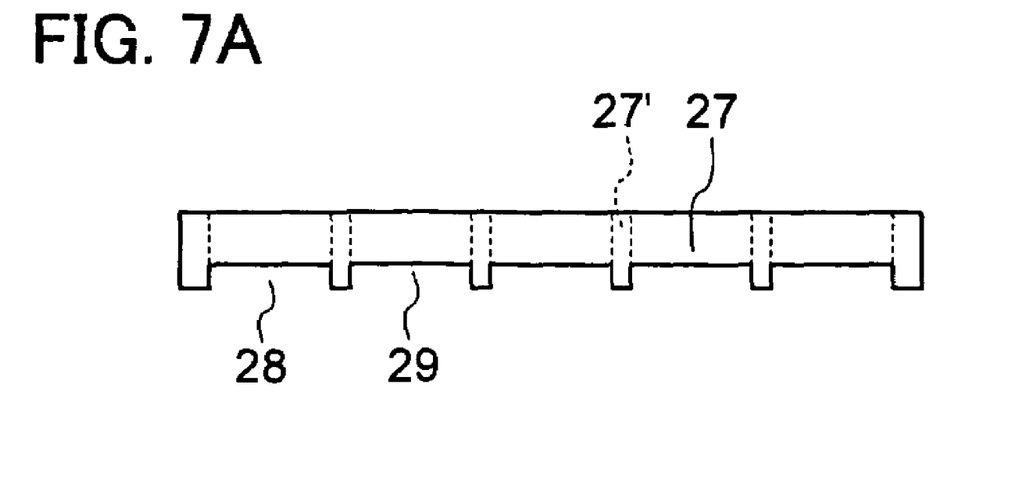
FIGS. 7A and 7B are cross-sectional views illustrating X–X' cross section of a modified example of the bottom part of the dripping container.
Figure 7B:
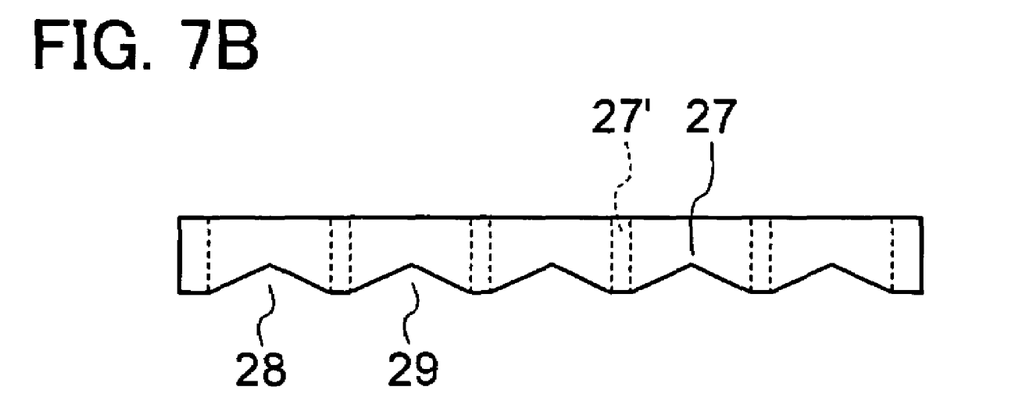

As shown in FIGS. 5A and 5B, the bottom part 23 is formed into gridiron having a plurality of opening parts 26, which is formed into one piece of the dripping container 2 and molded with a plastic material. A liquid leading part 28 formed by connected arch parts 29 is formed on the back side (the side facing the liquid-absorbing sheet 6) of the bottom part 23. The bottom part 23 has lateral bridges 27 in the width direction and longitudinal bridges 27' in the longitudinal direction which make the bottom part 23 to be the grid-like shape as shown FIG. 6A and FIG. 6B. FIG. 6A is a cross-sectional view illustrating X–X' cross section of the bottom part shown in FIG. 5A and FIG. 6B is a cross-sectional view illustrating Y–Y' cross section of the bottom part shown in FIG. 5A In this embodiment, the arch parts 29 are formed on the back side of the lateral bridges 27. As shown in FIG. 6A, the arch part 29 comprising the liquid leading part 28 is an arch that height h is about 4 mm and chord length 1 is about 8 mm. In addition, it is preferable that the height of the arch is 3 to 5 mm and the chord length of the arch is 6 to 12 mm, but it is not limited to this as long as the liquid leading part is formed such a shape that can easily lead liquid. For example, continuous arches forming the liquid leading part are acceptable to form prismatic projecting parts 30 as shown in FIG. 7A. Alternatively, it is fine to form into a reverse V-shape as shown in FIG. 7B.

Furthermore, the liquid leading part 28 is formed on the lateral bridges 27 of the bottom part 23 in the width direction in the embodiment, but it is acceptable to form the liquid leading part 28 on longitudinal bridges 27' in the longitudinal direction. Moreover, it is fine to form the liquid leading part 28 on both lateral bridges 27 and longitudinal bridges 27' in the lateral and longitudinal directions. It is preferable to form the liquid leading part 28 on the lateral bridges 27 and the longitudinal bridges 27' in both directions because liquid is led more efficiently. Besides, in this case, it is more preferable that liquid collects on the liquid leading part 28 from each of the bridges 27 and 27' and easily drops onto the liquid-absorbing sheet by projecting the portions where the bridges 27 and 27' in both directions intersect with each other.

Figure 8A:
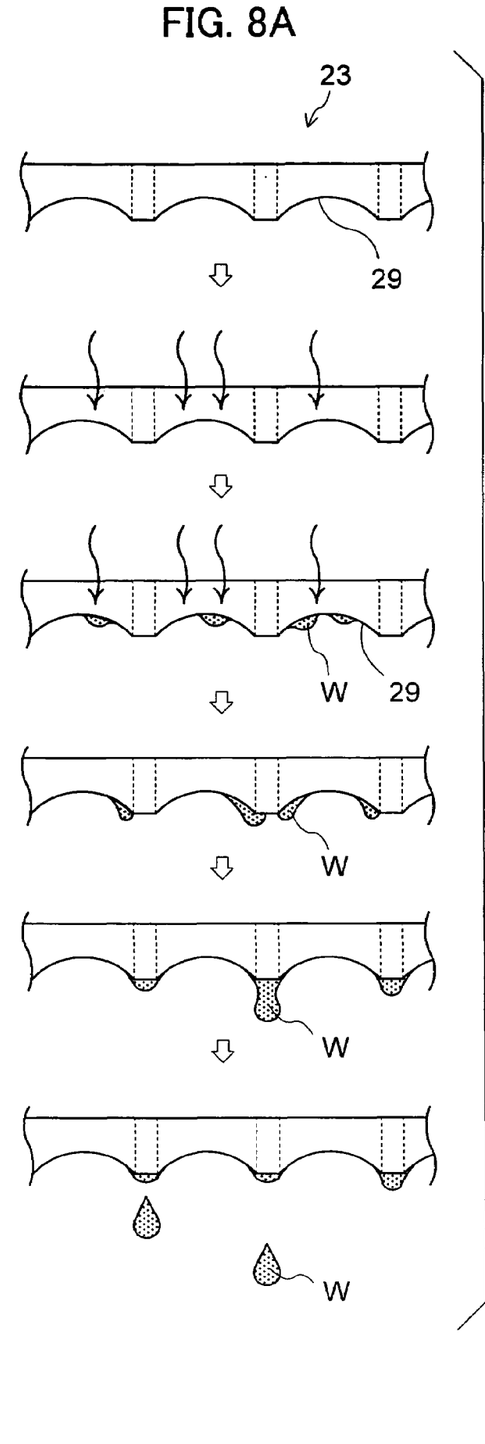
FIG. 8A is an explanatory drawing illustrating a state of liquid movement in arch parts and FIG. 8B is an explanatory drawing illustrating a state of liquid movement in the traditional animal toilet.

Liquid such as animal urine is evacuated onto the top side of the bottom part 23, passes through the bottom part 23, and drips onto the liquid-absorbing sheet 6 placed under the bottom part 23. The liquid such as animal urine moved to the arch parts 29 on the back side of the bottom part 23 efficiently aggregates on the projecting parts 30 formed by connecting the arch parts 29 each other along the arches, and drips onto the liquid-absorbing sheet 6 in large liquid drops W, as shown in FIG. 8A. Therefore, the evacuated liquid such as urine is delivered from the bottom part 23 quickly.

Figure 8B:
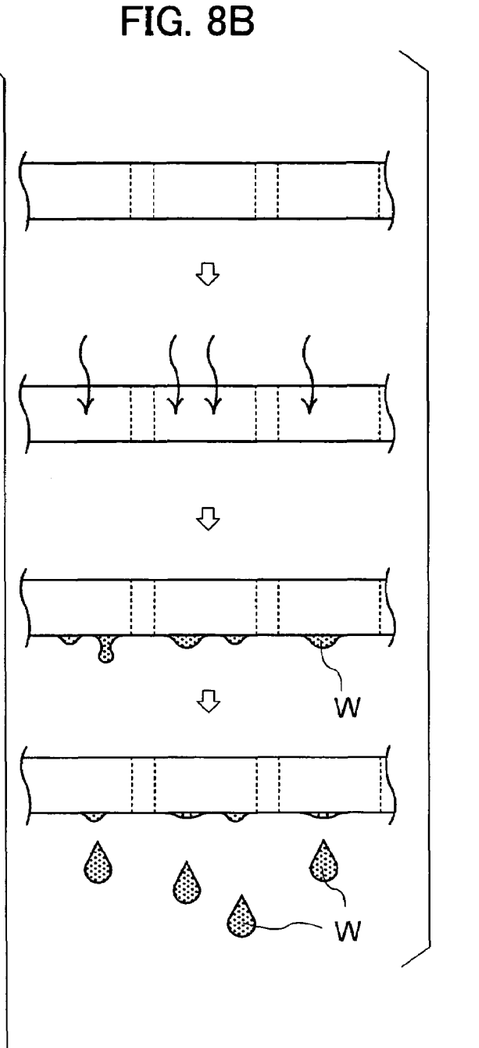
Figure 9:
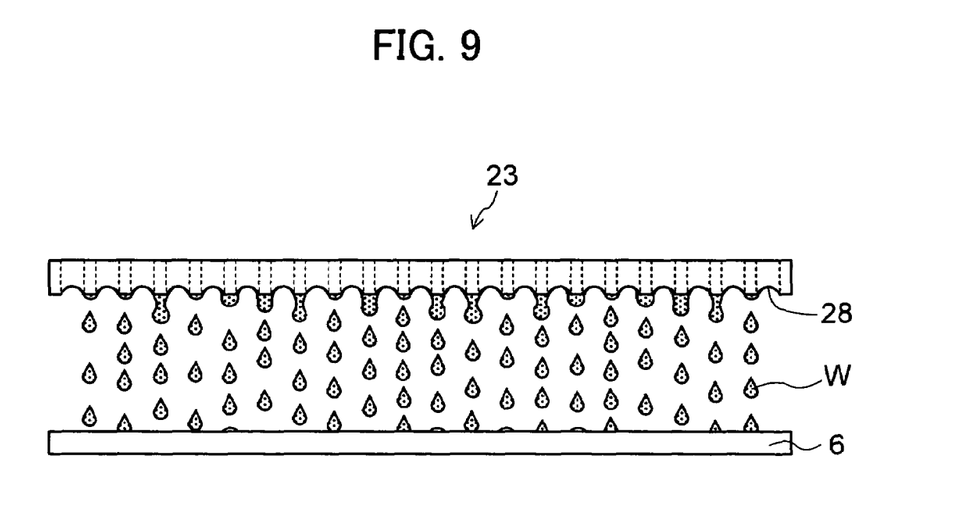
FIG. 9 is a schematic diagram illustrating a state of liquid dripping like raindrops from a liquid leading part.

On the other hand, since the traditional product as shown in FIG. 8B does not have the liquid leading parts as in the present invention on the back side of the bottom part, liquid having moved to the back side cannot efficiently drip downward and the evacuated liquid such as urine is likely to aggregate on the bottom part. Furthermore, since the liquid leading part 28 is formed by a plurality of the arch parts 29 connected each other in the present invention, liquid is widely dispersed by the liquid leading part 28 when it moves to the back side of the bottom part 23, and liquid drops all over the liquid-absorbing sheet 6 as it is dispersed as shown in FIG. 9. Accordingly, the liquid absorption efficiency of the liquid-absorbing sheet 6 is improved. Additionally, it can be prevented that unevenly absorbed liquid causes a saturation state in a certain part of the liquid-absorbing sheet 6 to shorten a period of time to change the liquid-absorbing sheet 6 can be prevented.

An open area ratio (the ratio of the total opening area to the area of the bottom part) is 25 to 50%, preferably 40 to 45%. When the open area ratio is smaller than 25%, liquid such as urine evacuated from an animal such as a cat takes time to pass through the bottom part 23. Moreover, when the open area ratio is greater than 50%, it is likely that the bottom part 23 is broken when an animal such as a cat is on it because of the strength of the bottom part 23 is reduced.

The bottom part 23 preferably has surface wettability. When the surface of the bottom part 23 has wettability, liquid such as urine touches the bottom part 23 and spreads at a proper degree to easily aggregates on the projecting parts 30 (the portions where the lateral bridges 27 intersect with the longitudinal bridges 27') formed by connected arch parts 29 along the arch parts 29 of the liquid leading part 28. Therefore, liquid efficiently drips downward from the bottom part 23. As a scheme to provide the surface wettability, schemes are named that a surface active agent such as an antistatic agent or nonionic surface active agent is applied to the surface of the lateral bridges 27 and longitudinal bridges 27' forming the opening parts 26 of the bottom part 23, or is mixed in a plastic raw material in molding.

The bottom part 23 is formed into one piece with the dripping container 2 in this embodiment, but the bottom part 23 can be formed separately from main frame of the dripping container. In this case, not shown in the drawing, it is acceptable that a support bar for supporting the bottom part is disposed at a predetermined position inside the sidewalls of the dripping container over the entire circumference and the bottom part is placed on the support bar. Thus, the bottom part is detachable, and can be cleaned alone.

As shown in FIG. 2, the liquid-absorbing sheet holder 3 is a box in a drawer shape configured of a bottom plate part 33, a side plate part 32 in three sides erected on the rim of the bottom plate part 33, and a front plate part 31. As similar to the dripping container 2, the liquid-absorbing sheet holder 3 is formed by molding plastic materials including polyolefine resins such as polyethylene (PE), polypropylene (PP) and polyethylene terephthalate (PET), and metal plates such as stainless steel. The liquid-absorbing sheet holder 3 is a drawer body disposed under the dripping container 2 and is loadable from the drawer opening 25 formed in the dripping container 2. Chain double-dashed lines in FIG. 3 depict a state that the liquid-absorbing sheet holder 3 is drawn. Furthermore, the front plate part 31 has the same size as that of the drawer opening 25 of the dripping container 2 or greater than that, which is configured to block the drawer opening 25 when the liquid-absorbing sheet holder 3 is housed in the dripping container 2. Thus, odors of urine absorbed into the liquid-absorbing sheet 6 are prevented from leaking out. Moreover, the bottom plate part 33 is formed to have the same size as that of the bottom part 23 of the dripping container 2 or greater than that. In this case, since the liquid-absorbing sheet 6 housed in the liquid-absorbing sheet holder 3 having the same size as that of the bottom part 23 of the dripping container 2 or greater than that can be used, liquid such as urine dripping from the bottom part 23 surely drops onto the liquid-absorbing sheet 6 for absorption.

As shown in FIG. 2, the cover 4 is a frame body that has a nearly rectangular bottom frame 41 as a bottom, a wall body 42 erected on the bottom frame 41 in three sides and a cover opening 43 for an animal going in and out formed in the remaining side. The cover 4 is formed by molding plastic materials including polyolefine resins such as polyethylene (PE), polypropylene (PP) and polyethylene terephthalate (PET), and metal plates such as stainless steel. The bottom frame 41 has almost the same size as that of the top end part of the dripping container 2, which is formed to be fit to the top end part of the dripping container 2. The height of the wall body 42 is at least 10 cm or higher, preferably 10 to 40 cm so as to prevent an animal from entering and exiting through a place other than the cover opening 43.

In addition, the animal toilet 1 of this embodiment has the structure that the cover 4 is placed and fit to the top part of the dripping container 2, but it is acceptable not to provide the cover 4.

Figure 10:
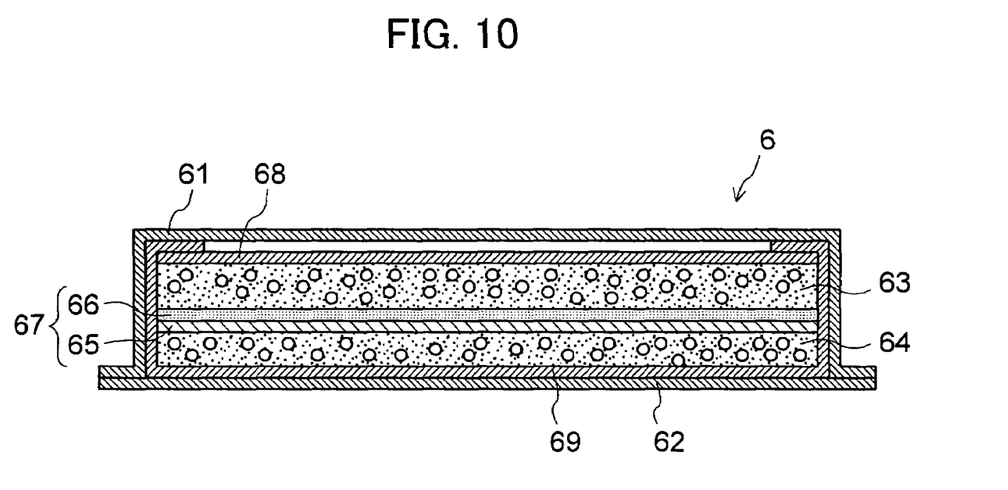
FIG. 10 is a cross-sectional view in the thickness direction illustrating the configuration of a liquid-absorbing sheet.

As shown in FIG. 10, the liquid-absorbing sheet 6 has a liquid permeable front layer 61 and a liquid impermeable back layer 62. An upper absorption layer 63 and a lower absorption layer 64 having liquid absorbing ability are formed between the liquid permeable front layer 61 and the liquid impermeable back layer 62. The liquid permeable front layer 61 is white, and the liquid impermeable back layer 62 is colored. An antimicrobial and bacteriostatic part 67 formed by an antimicrobial part 65 and a bacteriostatic part 66 contacting each other is disposed between the upper absorption layer 63 and the lower absorption layer 64. The upper absorption layer 63 and the lower absorption layer 64 contain pulp and a super absorbent polymer. An upper layer tissue 68 is sandwiched between the upper absorption layer 63 and the liquid permeable front layer 61, and an under layer tissue 69 is sandwiched between the lower absorption layer 64 and the liquid impermeable back layer 62. The upper layer tissue 68 and the under layer tissue 69 are both white. The antimicrobial part 65 is formed to contain an antimicrobial property imparting ingredient such as didecyldimethylammonium adipate, a kind of a cationic surfactant. The bacteriostatic part 66 is formed to contain a bacteriostatic property imparting ingredient such as citric acid that is highly safe as a pH control agent.

When the liquid-absorbing sheet like this is used, the occurrence of odors of urine can be prevented or urine can be prevented from becoming rotten, and the liquid-absorbing sheet can be used longer because the sanitary condition of the liquid-absorbing sheet can be kept.

In addition, the liquid-absorbing sheet 6 is not limited to the above. It is acceptable to use liquid-absorbing sheets generally used for animals including liquid-absorbing sheets such as nonwoven fabric, paper and sheeted cotton, and liquid-absorbing materials such as water absorbent polymers and silica gel, and crushed pulp.

As described above, the animal toilet according to the invention has been described specifically with reference to the drawings showing the examples. However, the invention is not limited to the examples shown in the drawings, which can be modified properly in the scope applicable to the teachings. Any modifications are included in the technical field of the invention.

As described above, the animal toilet according to the invention is configured of the dripping container and the liquid-absorbing sheet holder for housing the liquid-absorbing sheet for absorbing urine, in which the liquid leading part formed by a plurality of connected arches is disposed in the bottom part of the dripping container on the side facing the liquid-absorbing sheet. Therefore, urine evacuated by an animal such as a cat passes through the liquid penetrating bottom part and moves to the back side of the bottom part (the side facing the liquid-absorbing sheet). It is efficiently collected along the liquid leading part formed by connected arches on the back side of the bottom part, and drips onto the liquid-absorbing sheet disposed below for absorption. Furthermore, since the liquid-absorbing sheet is not in contact with the bottom part of the dripping container, liquid such as urine having been absorbed into the liquid-absorbing sheet does not return back to the bottom part.

Moreover, the bottom part can be separated from the dripping container to allow the litter box to be cleaned separately from a litter box main body. Therefore, effort in cleaning is more simplified.

What is claimed is:

1. An animal toilet comprising:
    a dripping container having an opening for an animal entering and exiting, and a liquid passing bottom part; and
    a liquid-absorbing sheet holder placed under the bottom part of the dripping container on for holding a liquid-absorbing sheet thereon,
    wherein the bottom part of the dripping container comprises a grid of connected longitudinal elements and lateral elements, the lateral elements defining arches on a side of the bottom part facing the liquid-absorbing sheet, and
    wherein the arches has end portions that coincide with the longitudinal elements and central portions that are spaced further from the liquid-absorbing sheet holder than the end portions, so that a liquid dispersed on the bottom part of the dripping container will be directed by the arches toward the ends of the arches.

2. The animal toilet according to claim 1, wherein the bottom comprises a plurality of opening parts, and
    wherein an open area ratio of the opening part of the bottom part occupied by the opening parts is 25 to 50% of the bottom part.

3. The animal toilet according to claim 2, wherein the bottom part is detachable from the dripping container.

4. The animal toilet according to claim 2, wherein the liquid-absorbing sheet has an area greater than that of the bottom part of the dripping container.

5. The animal toilet according to claim 2, wherein the liquid-absorbing sheet holder is loadably incorporated under the bottom part of the dripping container.

6. The animal toilet according to claim 2, wherein the animal toilet has a drawer structure that houses the liquid-absorbing sheet.

7. The animal toilet according to claim 2, wherein the animal toilet has a removable cover for controlling a direction of an animal entering and exiting.

8. The animal toilet according to claim 1, wherein the bottom part is detachable from the dripping container.

9. The animal toilet according to claim 1, wherein the liquid-absorbing sheet has an area greater than that of the bottom part of the dripping container.

10. The animal toilet according to claim 1, wherein the liquid-absorbing sheet holder is loadably incorporated under the bottom part of the dripping container.

11. The animal toilet according to claim 1, wherein the animal toilet has a drawer structure that houses the liquid-absorbing sheet.

12. The animal toilet according to claim 1, wherein the animal toilet has a drawer structure that houses the liquid-absorbing sheet holder, and
    wherein the liquid-absorbing sheet holder is loadably incorporated under the bottom part of the dripping container as a drawer.

13. The animal toilet according to claim 1, wherein the animal toilet has a removable cover for controlling a direction of an animal entering and exiting.

14. The animal toilet according to claim 1, wherein the liquid-absorbing sheet has an antimicrobial and bacteriostatic part having both an antimicrobial property and a bacteriostatic property.

15. The animal toilet according to claim 1, wherein the liquid-absorbing sheet has an antimicrobial and bacteriostatic part having both an antimicrobial property and a bacteriostatic property.

* * * * *